Sept. 22, 1953      O. SCHNYDER      2,653,004

PIVOTED STOP VALVE

Filed Feb. 21, 1947

Inventor:
Othmar Schnyder
by Sommers Young
Attorneys

Patented Sept. 22, 1953

2,653,004

UNITED STATES PATENT OFFICE 2,653,004

PIVOTED STOP VALVE

Othmar Schnyder, Klus, Switzerland, assignor to Gesellschaft der Ludw. von Roll'schen Eisenwerke A. G., Gerlafingen, Switzerland Application February 21, 1947, Serial No. 730,038
In Switzerland October 7, 1942

Section 1, Public Law 690, August 8, 1946
Patent expires October 7, 1962

3 Claims. (Cl. 251—103)

My present invention relates to improvements, in general, in pipe-line stop valves of the pivoted cylindrical type and in particular in the packing-arrangement therefor, and the main object of my improvements is to afford facilities permitting of removing and replacing the defective packing without the necessity of draining the pipe line nor of providing an auxiliary stop valve, nor of removing the stop valve.

Pipe-line stop valves are known in the art, the packing means of which may be removed and replaced without the necessity of removing the valve from the pipe line. Such prior valves, however, have the disadvantage that, for the purpose of inspecting, removing and replacing the packing, the upstream pipe line has to be drained or an auxiliary stop valve be provided therein.

In the valve according to my present invention, now, such disadvantage of prior art is eliminated by providing, aside from the customary or primary packing-arrangement, an auxiliary or secondary packing-arrangement which is taken into operation when removing the primary packing-arrangement. By the use of such secondary arrangement, therefore, the upstream pipe-line does not have to be drained nor an auxiliary stop valve be provided for.

Such auxiliary or secondary packing-arrangement also may comprise a metal ring and a gasket made of highly elastic material projecting over the former ring, a second metal ring mounted movable in the valve case co-acting with the said two rings. Such latter sealing arrangement renders the auxiliary or secondary packing means particularly effective.

Figure 1:
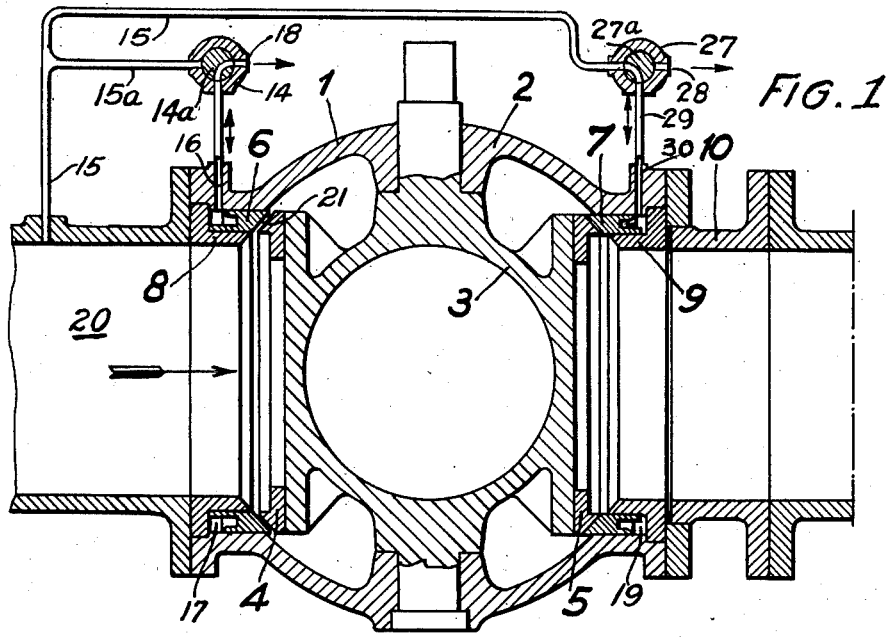
Figure 2:
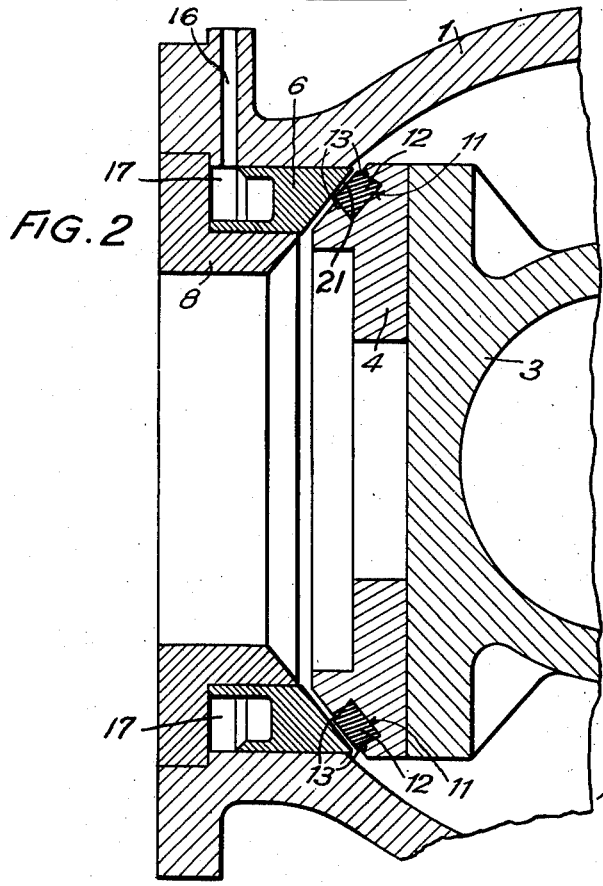

Two forms of my present invention are shown in the accompanying drawing in Figs. 1 and 2 respectively, showing a longitudinal section each.

As seen from Fig. 1, showing the valve in its closed position, the valve case comprises two portions 1, 2. The valve body 3, which is of tubular shape, is pivoted in the said case, its axis of rotation extending at right angles to the pipe-line axis. The two packing rings 4, 5 are secured to body 3, e. g. by means of a detachable screw-connection. The sealing faces of rings 4, 5 lie, in known manner, on the surface of a sphere, the center of which coincides with the point of intersection of pipe-line axis and axis of rotation of body 3. The rings 6, 7 which, in contra-distinction to rings 4, 5 mounted on body 3, are displaceable or slideable rings and are suitably mounted in case 1, 2, may be uniformly pressed—in the direction of the pipe-line axis—against rings 4, 5; e. g. by means of a suitable control pressure medium, such as water introduced into chambers 17, 19 behind rings 6, 7, respectively, which pressure medium is supplied through conduits 15, 15a, valve means 14 and duct 16 for displacing auxiliary sealing ring 6; and through conduit 15, valve means 27, conduits 29 and duct 30 for displacing main sealing ring 7, thus attaining a perfect seal. The movable service packing ring 7 and the auxiliary packing ring 6 may be controlled in known manner by a suitable fluid pressure medium, for example, as disclosed in Swiss Patent No. 131,734. Supply of pressure medium to auxiliary packing ring 6 may be controlled by means of valve means 14 provided with a turnable control cock 14a. Control valve means 14 is connected with the pressure pipe 20 on the upstream side of the valve 1 by means of conduit 15 and branch-conduit 15a; and with the annular chamber 17 disposed rearwardly of movable auxiliary packing ring 6 by means of duct 16. Valve port 18 opens into the free atmosphere and serves as venting means in a manner to be more fully described hereinbelow. Supply of pressure medium to the main service packing ring 7 may be controlled by means of valve means 27 similar to valve means 14 and provided with a turnable control cock 27a, the pressure medium being supplied to annular chamber 19 on the downstream side of ring 7 through conduit 15, valve means 27, conduit 29 and duct 30. Control valve means 27 is also provided with a venting port 28 which opens into the free atmosphere. Rings 6, 7, which preferably are made of metal, are guided, inside, on ring-liners 8, 9 mounted in case 1, 2, and outside, within the latter.

In the sealing arrangement described, the upstream rings 4, 6 serve as emergency seal, and the downstream rings 5, 7, as common or service seal. When, now, the latter has to be removed or replaced, the control cock 14a is turned ninety degrees in a clockwise direction from its normal operative position illustrated in Fig. 1, whereupon duct 16 is brought into communication with pressure conduit 15 through branch-conduit 15a, instead of being vented to the atmosphere through venting port 18 (only the latter position being illustrated in Fig. 1). Annular chamber 17 is thus placed under pressure, simultaneously forcing auxiliary packing ring 6 under pressure into operative sealing engagement against fixed ring 4. In order to relieve the pressure within the annular chamber 19 preliminary to inspection and removal of main packing ring 7, control cock 27a of valve 27 is now turned ninety degrees in a counter-clockwise direction from the position illustrated in Fig. 1, whereupon duct 30 is brought into communication with valve port 28, thereby venting chamber 19. Upon the release of pressure within chamber 19, the displaceable service packing ring 7 will retract slightly from its normal operative sealing position illustrated in Fig. 1 and will no longer seal chamber 19 since it has been brought out of sealing engagement against fixed ring 5. The condition of the service sealing joint 5, 7 and the auxiliary sealing joint 4, 6 is now the reverse of that shown in Fig. 1. Ring 6 is maintained in firm pressed engagement against fixed ring 4 to thereby seal pipe 20, while a small gap is now defined between fixed ring 5 and the service packing ring 7. As a consequence, the expansion element 10 may be removed, whereupon the ring liner 9 may be slacked and removed together with movable ring 7. Ring 5 also may be detached from body 3 and removed. After completion of repair or replacement of rings 5 and/or 7, valve 2 may be reassembled and annular chamber 19 is again placed under pressure by restoring valve cock 27a to the position of Fig. 1. After having turned valve cock 14a the pressure existing in pressure pipe 20 now forces retraction of auxiliary packing ring 6 within chamber 17, thereby causing re-establishment of the gap 21 between said auxiliary packing ring and fixed ring 4 while the main packing ring 7 is firmly pressed into engagement against fixed ring 5, thereby sealing pipe 20. Since in the closed position of the valve 2 (illustrated in Fig. 1), the same pressure prevails on both the upstream and downstream sides of the rings 4 and 6, now flow occurs through the annular gap 21, and accordingly rings 4 and 6 are not subjected to wear. This feature of the present invention is a considerable advantage over valves of conventional design, wherein no annular gap is provided between the packing rings on the inlet side of the valve. The absence of such a gap, together with the fact that the pressure on the downstream side of the packing rings at the inlet side of the valve is less than in the pressure pipe, is a distinct disadvantage, since a grain of sand or even a mere scratch on the sealing surface of the valve parts suffices to cause flow past the engaged sealing surfaces, which undesirable flow results in progressive deterioration of the packing rings on the inlet side of the valve and ultimately renders the valve mechanism useless.

Rings 5, 7 of the common or service seal preferably are made of a corrosion-proof metal. The movable ring 6 of the emergency seal, however, in many cases may be made of a cheaper material, e. g. rubber.

In the embodiment according to Fig. 2, valve body 3 is journaled in casing portion 1. The erection seal shown comprises a metal ring 4 secured to body 3. A second ring 12 made of a soft and elastic material, e. g. rubber, is inserted into an annular groove 11 of ring 4, and slightly projects beyond the sealing face of the latter. A metal ring 6, mounted axially displaceable in valve-casing portion 1, co-acts with the two rings 4 and 12. Ring 6 is guided inside by ring liner 8, and may be uniformly pressed against rings 4, 12, by means of a pressure fluid, for example, by control pressure water, said pressure fluid being introduced into chamber 17 behind auxiliary sealing ring 6 through conduit 16. During such latter operation, ring 6 first contacts ring 12 which is made of soft and elastic material, and compresses same, the material thereof being capable of yielding laterally into the recesses 13 in groove 11. Ring 6 subsequently may be pressed with still sufficient sealing force onto ring 4.

The service seal is not shown in Fig. 2, being adapted similar as in the example of Fig. 1.

Although two specific embodiments of the invention have been described and shown in the drawing, it should be noted that the invention may be realized in modified form and adaptations of the arrangements herein disclosed may be made, as may readily occur to persons skilled in the art without constituting a departure from the spirit and scope of the invention as defined in the objects and in the appended claims.

Having thus described the invention, what is claimed as new and desired to be secured by Letters Patent, is:

1. A hollow valve body having opposed inlet and outlet passages connected to a pressure fluid inlet conduit and a removable expansion element leading to an outlet conduit, respectively, comprising a rotatable plug member mounted in said valve body for controlling flow of said pressure fluid through the latter, first cooperable sealing means mounted within said outlet passage and on said plug member, said first cooperable sealing means being provided with first annular piston means slidably guided within said valve body and having a first end wall which in retracted position of said first piston means lies substantially flush with an adjacent portion of the inside surface of said valve body, and first ring means having a second end wall conformed to and sealingly engaged with said first end wall when the latter projects beyond the inside surface of said valve body, to thereby shut off flow of pressure fluid through said outlet passage second cooperable sealing means mounted within said inlet passage and on said plug member, said second cooperable sealing means being provided with second annular piston means slidably guided within said valve body and having a third end wall which in retracted position of said second piston means lies substantially flush with an adjacent portion of the inside surface of said valve body, second ring means having a fourth end wall conformed to said third end wall, said second ring means being adapted to sealingly engage said third end wall of said second piston means when the latter projects outwardly beyond the inside surface of said valve body, duct means connected to said inlet conduit, and valve means in said duct means for conducting pressure fluid alternately against said first and second piston means and simultaneously and respectively permitting relief of pressure against said second and said first piston means, whereby when said second piston means projects beyond the inside surface of said valve body flow of pressure fluid through said inlet passage is shut off and said first sealing means may be replaced without draining said inlet conduit or removing said valve body from the latter, and whereby when said second piston lies substantially flush with the inside surface of said valve body, pressure of fluid located within said inlet conduit past said second sealing means and downstream thereof within said valve body is equalized to thereby prevent destruction of said second sealing means, and said first sealing means shuts off flow of pressure fluid therethrough.

2. A hollow valve body according to claim 1, wherein said second cooperable sealing means is further provided with resilient contact means removably mounted on said fourth end wall, whereby destruction of said resilient contact means is prevented although flow of pressure fluid through said valve body is shut off.

3. A valve structure having opposed inlet and outlet passageways connectable to pressure fluid inlet and outlet conduits; comprising a valve housing, a removable expansion element between said valve housing and said outlet conduit, plug means mounted for rotation in said valve housing and for controlling flow of said pressure fluid through said valve housing, respective cooperable sealing means mounted within said inlet and outlet passageways and on said plug member, said sealing means including annular piston means guided for movement between a plurality of predetermined positions and located within said valve housing, said sealing means further including ring means engageable with said annular piston means in a first position of the latter to thereby shut off flow of pressure fluid through said outlet passageway and to facilitate removal of said expansion element from said outlet conduit, duct means leading outside said valve housing and adapted for communication with said inlet conduit and said annular piston means, valve means in said duct means for controlling flow of pressure fluid to said piston means, to thereby permit relief of pressure by said pressure fluid against at least one of said piston means, whereby when said one piston means of one of said sealing means is in a second position flow of pressure fluid through said inlet passageway is shut off and another of said sealing means may be replaced without draining said inlet conduit and removing said valve housing from the latter, whereas when said one piston means is in a third position pressure of fluid located within said inlet conduit past said one sealing means and downstream thereof within said valve housing is equalized, thus preventing destruction of said one sealing means, while said other sealing means shuts off flow of pressure fluid through said valve housing into said expansion element and said outlet conduit, and resilient contact means incorporated in at least one of said ring means for cooperation with the respective sealing means.

OTHMAR SCHNYDER.

References Cited in the file of this patent

UNITED STATES PATENTS

| Number | Name | Date |
|---|---|---|
| 769,831 | Ogden | Sept. 13, 1904 |
| 783,953 | Henry | Feb. 28, 1905 |
| 1,476,344 | McGee et al. | Dec. 4, 1923 |
| 1,879,481 | Putnam | Sept. 27, 1932 |
| 1,954,018 | Miller | Apr. 10, 1934 |
| 2,091,618 | Szabo | Aug. 31, 1937 |
| 2,233,074 | Corbin | Feb. 25, 1941 |
| 2,357,232 | Snyder | Aug. 29, 1944 |

FOREIGN PATENTS

| Number | Country | Date |
|---|---|---|
| 131,734 | Switzerland | of 1929 |
| 174,749 | Switzerland | of 1935 |
| 174,750 | Switzerland | of 1935 |
| 520,188 | Germany | of 1931 |